(12) United States Patent
Jang et al.

(10) Patent No.: US 8,917,006 B2
(45) Date of Patent: Dec. 23, 2014

(54) STATOR FOR MOTOR

(75) Inventors: Jeong Cheol Jang, Gwangju (KR); Ji Min Lee, Gwangju (KR)

(73) Assignee: New Motech Co., Ltd., Gwangju (KR)

( * ) Notice: Subject to any disclaimer, the term of this patent is extended or adjusted under 35 U.S.C. 154(b) by 312 days.

(21) Appl. No.: 13/395,533

(22) PCT Filed: Oct. 23, 2010

(86) PCT No.: PCT/KR2010/007286
§ 371 (c)(1),
(2), (4) Date: Mar. 12, 2012

(87) PCT Pub. No.: WO2011/052930
PCT Pub. Date: May 5, 2011

(65) Prior Publication Data
US 2012/0169173 A1 Jul. 5, 2012

(30) Foreign Application Priority Data

Oct. 29, 2009 (KR) .......................... 10-2009-0103469

(51) Int. Cl.
*H02K 3/34* (2006.01)
*H02K 3/38* (2006.01)
*H02K 3/52* (2006.01)

(52) U.S. Cl.
CPC .............. *H02K 3/345* (2013.01); *H02K 3/522* (2013.01)
USPC .......................................... 310/215; 310/214

(58) Field of Classification Search
CPC ............ H02K 3/345; H02K 3/38; H02K 3/48
USPC .................................................. 310/215, 214
See application file for complete search history.

(56) References Cited

U.S. PATENT DOCUMENTS 1,486,874 A * 3/1924 Frederick ....................... 428/122
2,457,740 A * 12/1948 Sigmund et al. .............. 310/215
(Continued)

FOREIGN PATENT DOCUMENTS

CN 201590691 U * 9/2010
JP 2003061286 A * 2/2003 ............... H02K 3/34
(Continued)

OTHER PUBLICATIONS

Translation of foreign document KR 1020060078845 (Year: 2006).*

*Primary Examiner* — Alex W Mok
(74) *Attorney, Agent, or Firm* — Sherr & Jiang, PLLC

(57) ABSTRACT

The present invention relates to a stator for a motor including: a stator core having an annular back yoke and a plurality of teeth; an upper insulator having an annular body portion formed correspondingly to the back yoke of the stator core and a plurality of teeth insulation portions formed correspondingly to the teeth of the stator core so as to cover the upper sides of the teeth of the stator core; a lower insulator having an annular body portion formed correspondingly to the back yoke of the stator core and a plurality of teeth insulation portions formed correspondingly to the teeth of the stator core so as to cover the upper sides of the teeth of the stator core; a plurality of insulation films each adapted to be inserted into the slot to cover the side of the stator core exposed to the inside of the slot between the upper insulator and the lower insulator; and coils adapted to be wound on the teeth of the stator core enclosed by the upper insulator, the lower insulator and the insulation films.

4 Claims, 9 Drawing Sheets

(56) References Cited

U.S. PATENT DOCUMENTS

| | | | |
|---|---|---|---|
| 4,340,829 A * | 7/1982 | McCoy | 310/71 |
| 4,904,893 A * | 2/1990 | Snider et al. | 310/260 |
| 6,930,427 B2 * | 8/2005 | Grant et al. | 310/216.016 |
| 7,294,788 B2 * | 11/2007 | Yoshida et al. | 174/120 R |
| 7,352,098 B2 * | 4/2008 | Suzuki et al. | 310/215 |
| 8,076,819 B2 * | 12/2011 | Taema | 310/215 |
| 2007/0222323 A1 * | 9/2007 | Neet | 310/215 |
| 2007/0222324 A1 * | 9/2007 | Fukui et al. | 310/215 |
| 2009/0079291 A1 * | 3/2009 | Horiba et al. | 310/215 |
| 2009/0102311 A1 * | 4/2009 | Kotani et al. | 310/215 |
| 2009/0324435 A1 * | 12/2009 | Sears et al. | 417/423.7 |
| 2010/0264774 A1 * | 10/2010 | Tokunaga | 310/215 |
| 2011/0109189 A1 * | 5/2011 | Taema | 310/215 |
| 2011/0273053 A1 * | 11/2011 | Oka et al. | 310/215 |
| 2012/0080976 A1 * | 4/2012 | Oka et al. | 310/215 |

FOREIGN PATENT DOCUMENTS

| | | |
|---|---|---|
| JP | 2009-089493 A | 4/2009 |
| KR | 10-2006-0027704 A | 3/2006 |
| KR | 10-2006-0078845 A | 7/2006 |
| KR | 10-2009-0065936 A | 6/2009 |
| WO | WO 2008105054 A1 * | 9/2008 |
| WO | WO 2011076027 A1 * | 6/2011 |

* cited by examiner

10

STATOR FOR MOTOR

CROSS REFERENCE TO PRIOR APPLICATIONS

This application is a National Stage Patent Application of PCT International Patent Application No. ,PCT/KR2010/007286 (filed: on Oct. 23, 2010) under 35 U.S.C. §371, which claims priority to Korean Patent Application No. 10-2009-0103469 (filed on Oct. 29, 2009), which are all hereby incorporated by reference in their entirety.

TECHNICAL FIELD

The present invention relates to a stator for a motor, and more particularly, to a stator for a motor that has a structure in which insulation films are easily fixed to slots formed in a stator core to which upper and lower insulators are coupled.

BACKGROUND ART

In general, a motor transmits a rotating force of a rotor to a rotating shaft which drives a load. For example, the rotating shaft of the motor can drive a drum of a washing machine connected thereto, or a fan of a refrigerator connected thereto for supplying cold air to a required space.

Recently, a BLDC (brushless direct current) motor has been widely used since it has no brush to cause almost suppression of noise and to provide extended life span. The rotor in the BLDC motor becomes rotated through an electromagnetic interaction with a stator. So as to perform the electromagnetic interaction, coils, which are made of a material like copper or aluminum, are wound on the stator, and as electric current is applied to the coils, the rotor rotates with respect to the stator.

On the other hand, insulators are used to insulate the coils wound on the stator from the stator core. Generally, the insulator of conventional motors largely includes an upper insulator and a lower insulator made through plastic injection molding, wherein the upper insulator and the lower insulator are assembled to each other as one unit in such a manner as to completely cover the stator core.

By the way, in case where the upper insulator and the lower insulator are made through the plastic injection molding, the stacked heights of the stator core may be varied, and in this case, the molds for molding the upper insulator and the lower insulator are separately manufactured in accordance with the varied heights of the stator core.

Further, since the upper insulator and the lower insulator are plastic injection-molded materials, they have a predetermined thickness so that the spaces, that is, the slots, between teeth of the stator core become narrow to cause the spaces in which the coils are wound to be reduced.

Moreover, since the upper insulator and the lower insulator are formed to cover the entire teeth of the stator core, a quantity of the plastic material used becomes increased.

DISCLOSURE OF INVENTION

Technical Problem

Accordingly, the present invention has been made in view of the above-mentioned problems occurring in the prior art, and it is an object of the present invention to provide a stator for a motor that is configured wherein upper and lower insulators are adapted to cover the upper and lower sides of a stator core and insulation films are adapted to be inserted between the upper and lower insulators, such that even though the stacked heights of the stator core are varied, there is no need to separately manufacture the molds for molding the upper and lower insulators.

It is another object of the present invention to provide a stator for a motor that is configured wherein upper and lower insulators have a substantially thin thickness, such that the slots formed between the teeth of a stator core become enlarged to ensure the spaces in which coils are wound.

It is still another object of the present invention to provide a stator for a motor that is configured wherein upper and lower insulators are provided to partially cover the upper and lower portions of teeth of a stator core, such that a quantity of a plastic material used becomes reduced.

The above objects and other objects of the present invention will be easily achieved by a preferred embodiment of the present invention as will be described below.

Solution To Problem

To accomplish the above objects, according to the present invention, there is provided a stator for a motor including: a stator core having an annular back yoke and a plurality of teeth protruded annularly inwardly from the inner periphery of the back yoke or protruded annularly outwardly from the outer periphery of the back yoke, the teeth having a slot therebetween; an upper insulator having an annular body portion formed correspondingly to the back yoke of the stator core and a plurality of teeth insulation portions formed correspondingly to the teeth of the stator core in such a manner as to be protruded annularly from the body portion to cover the upper sides of the teeth of the stator core; a lower insulator having an annular body portion formed correspondingly to the back yoke of the stator core and a plurality of teeth insulation portions formed correspondingly to the teeth of the stator core in such a manner as to be protruded annularly from the body portion to cover the upper sides of the teeth of the stator core; a plurality of insulation films each adapted to be inserted into the slot to cover the side of the stator core exposed to the inside of the slot between the upper insulator and the lower insulator and having a center portion adapted to cover the side of the back yoke of the stator core exposed to the slot between the upper insulator and the lower insulator and side portions extended bent from both sides of the center portion to have a ⊏-shaped section so as to cover the sides of the teeth of the stator core; and coils adapted to be wound on the teeth of the stator core enclosed by the upper insulator, the lower insulator and the insulation films.

According to the present invention, desirably, the stator core has a plurality of teeth front end portions protruded in both side directions from the front ends of the teeth; each of the insulation films has end portions bent inwardly from the respective ends of the side portions so as to cover the sides of the teeth; the upper insulator has a plurality of front end insulation portions formed correspondingly to the teeth front end portions so as to cover the upper sides of the teeth front end portions of the stator core, each of the front end insulation portions having supporting walls protruded downwardly from the underside thereof, a front end supporting end formed at the outsides of the supporting walls so as to support the top end edges of the teeth front end portions of the stator core, and end supporting ends formed at the insides of the supporting walls so as to support the top end edges of the end portions of each of the insulation films; and the lower insulator having a plurality of front end insulation portions formed correspondingly to the teeth front end portions so as to cover the upper sides of the teeth front end portions of the stator core, each of the front end insulation portions having supporting walls protruded upwardly from the top thereof, a front end supporting end formed at the outsides of the supporting walls so as to support the bottom end edges of the teeth front end portions of the stator core, and end supporting ends formed at the insides of the supporting walls so as to support the bottom end edges of the end portions of each of the insulation films.

According to the present invention, desirably, each of the front end insulation portions of the lower insulator has locking protrusions protruded upwardly from the end supporting ends supporting the insulation film such that the bottom end edges of the end portions of the insulation film are insertedly disposed between the supporting walls and the locking protrusions.

According to the present invention, desirably, each of the insulation films has a locking portion formed folded outwardly from the lower end of the center portion, and the body portion of the lower insulator has locking hooks formed thereon so as to lock the end of the locking portion thereto.

According to the present invention, desirably, each of the insulation films is attached on the side of the back yoke or the sides of the teeth of the stator core contacted therewith by means of ultrasonic welding.

Advantageous Effects of Invention

Under the above-mentioned structure, the stator for the motor according to the present invention has the following advantages:

Firstly, the upper and lower insulators are adapted to cover the upper and lower portions of the stator core and the insulation films are adapted to be inserted between the upper and lower insulators, such that even though the stacked heights of the stator cores are varied, there is no need to separately manufacture the molds for molding the upper and lower insulators.

Secondly, the upper and lower insulators have a substantially thin thickness, such that the slots formed between the teeth of the stator core become enlarged to ensure the spaces in which coils are wound.

Lastly, the upper and lower insulators are provided to partially cover the upper and lower portion of the teeth of the stator core, such that a quantity of a plastic material used becomes reduced.

BEST MODE FOR CARRYING OUT THE INVENTION

Figure 1:
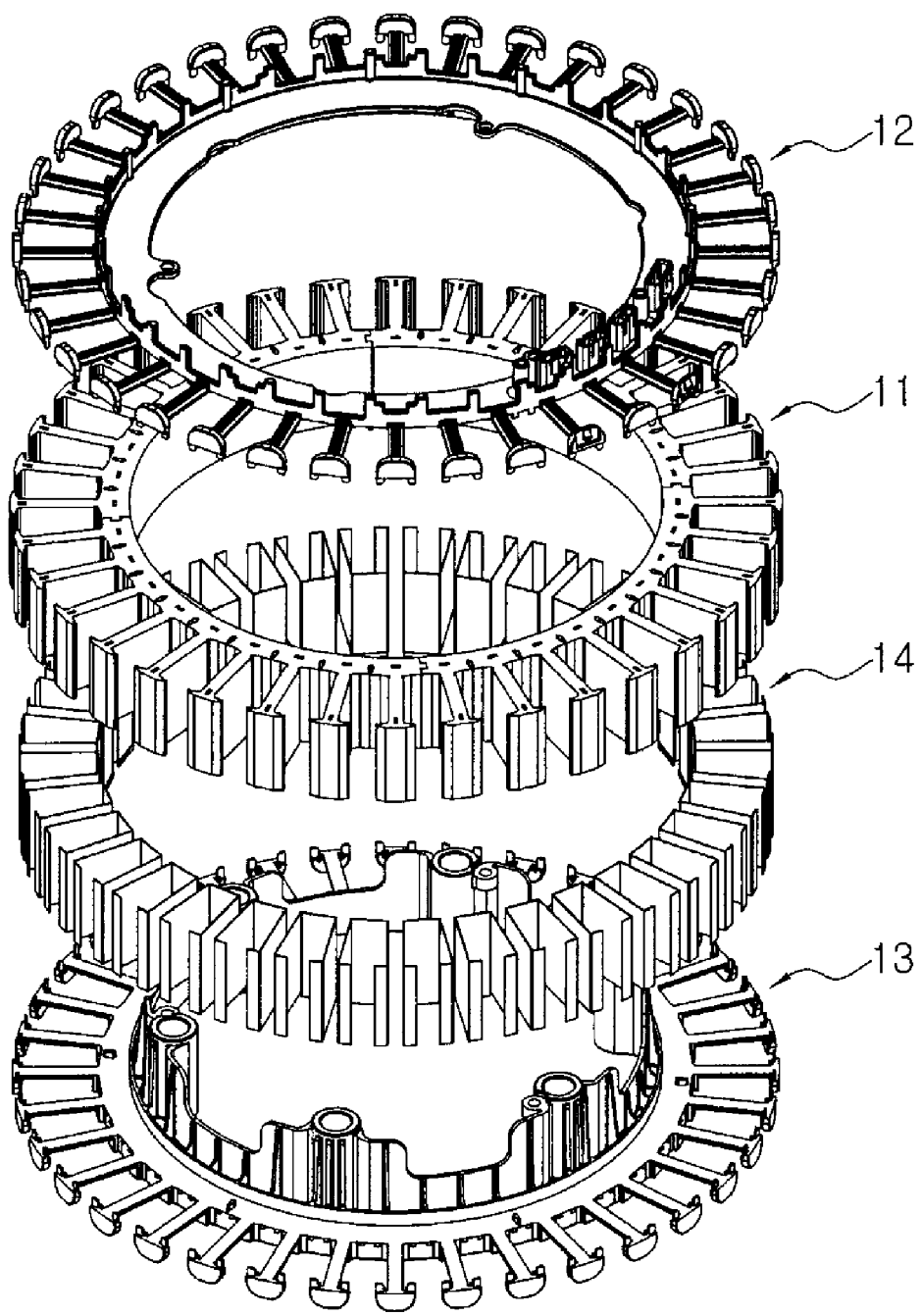
FIG. 1 is an exploded perspective view showing a stator for a motor according to the present invention.
Figure 2:
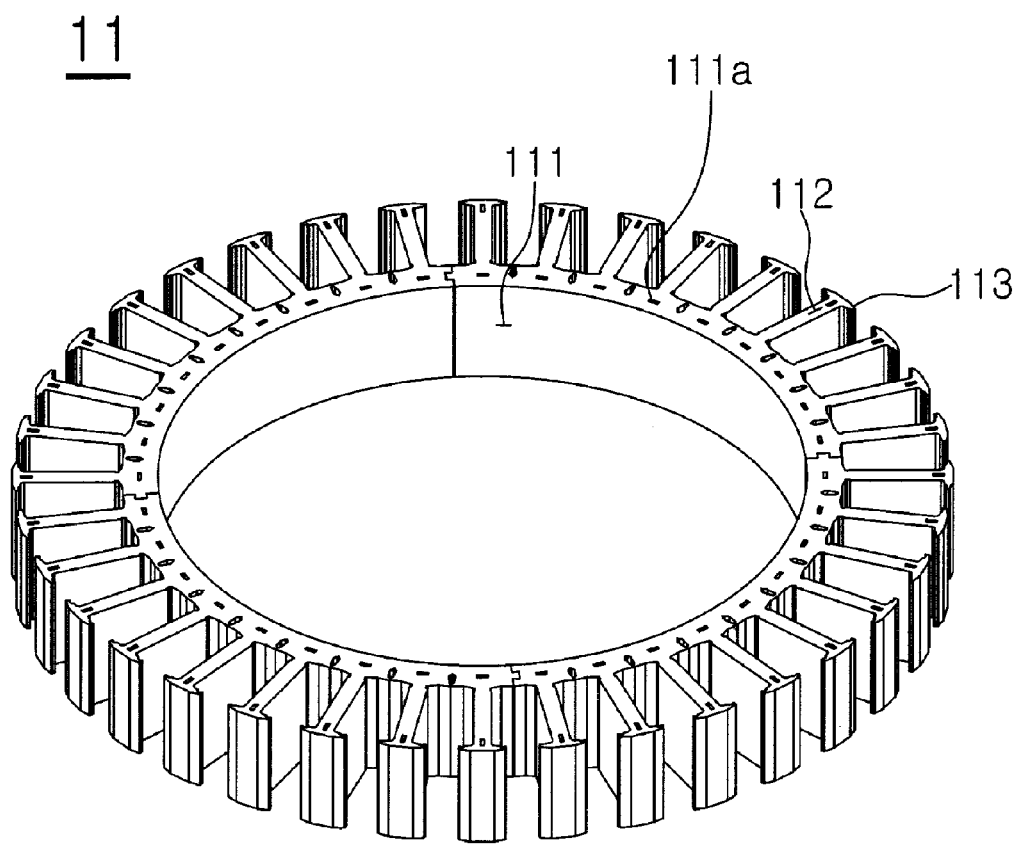
FIG. 2 is a perspective view showing a stator core of the stator for a motor according to the present invention.
Figure 3:
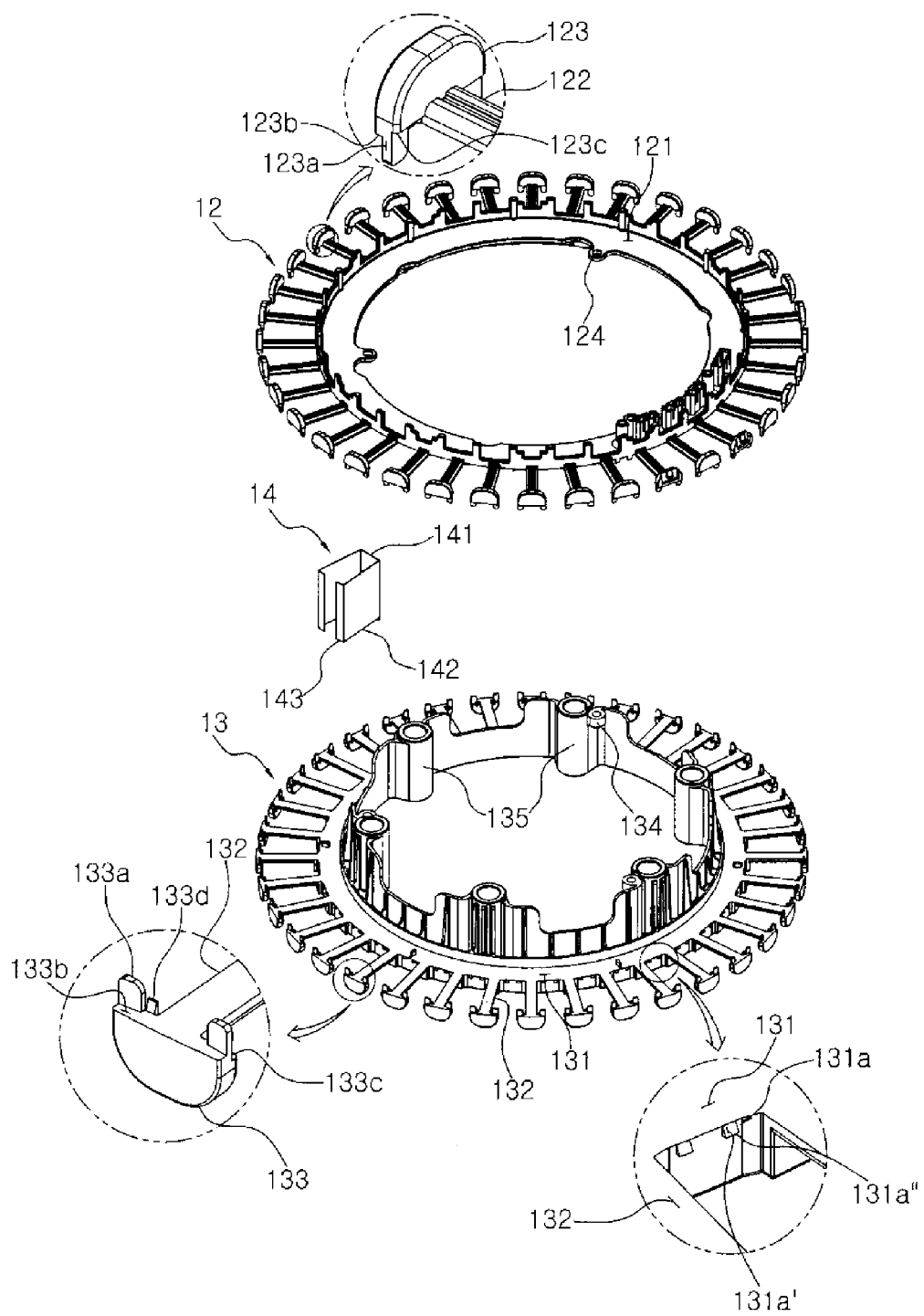
FIG. 3 is an exploded perspective view showing upper and lower insulators and an insulation film of the stator for a motor according to the present invention.
Figure 4:
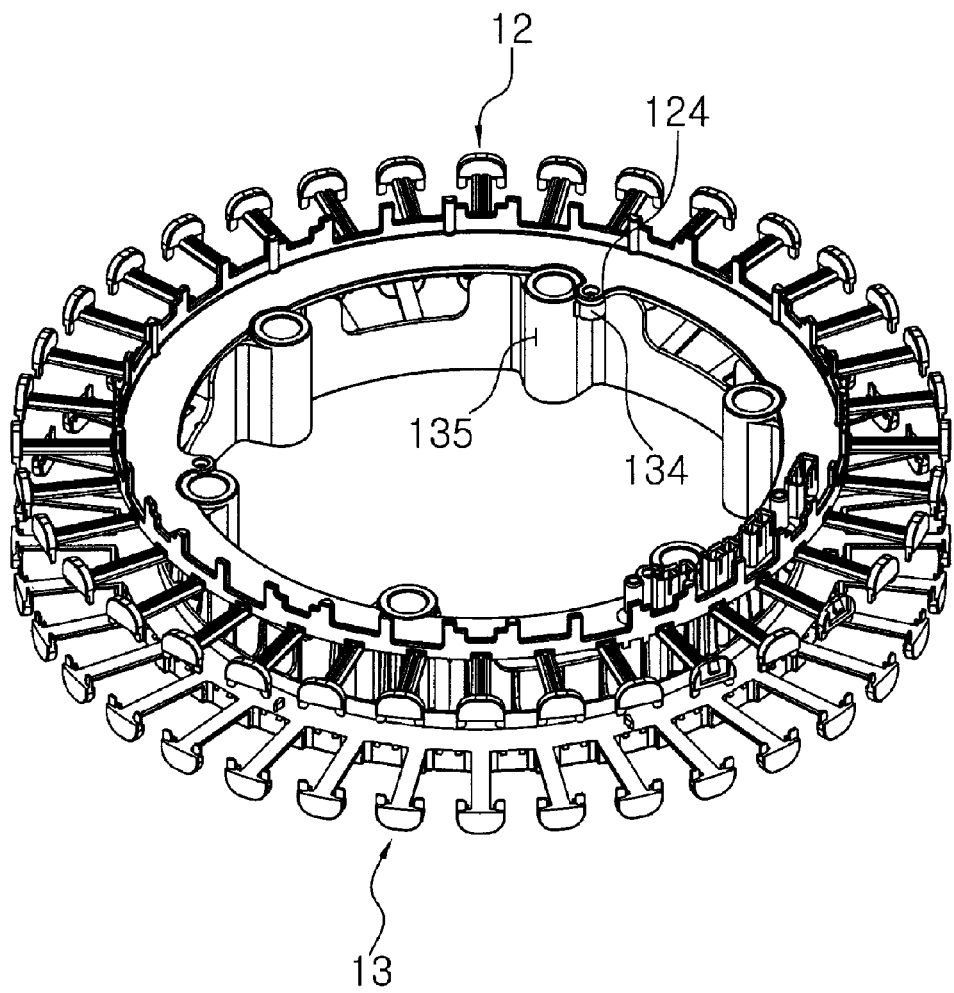
FIG. 4 is a perspective view showing the assembled state of the upper and lower insulators of the stator for a motor according to the present invention.
Figure 5:
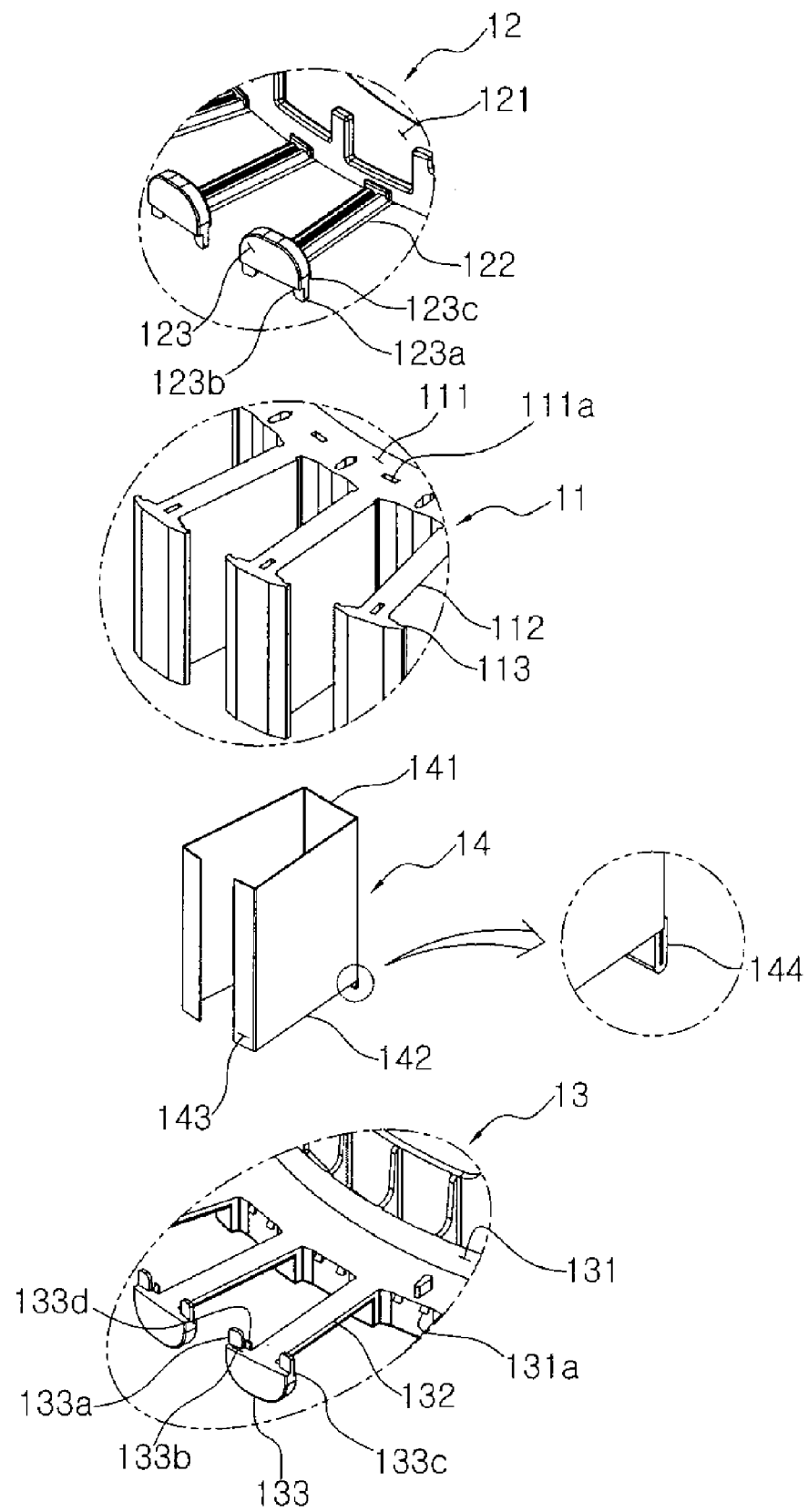
FIG. 5 is an exploded perspective view showing a portion of each part of the stator for a motor according to the present invention.
Figure 6:
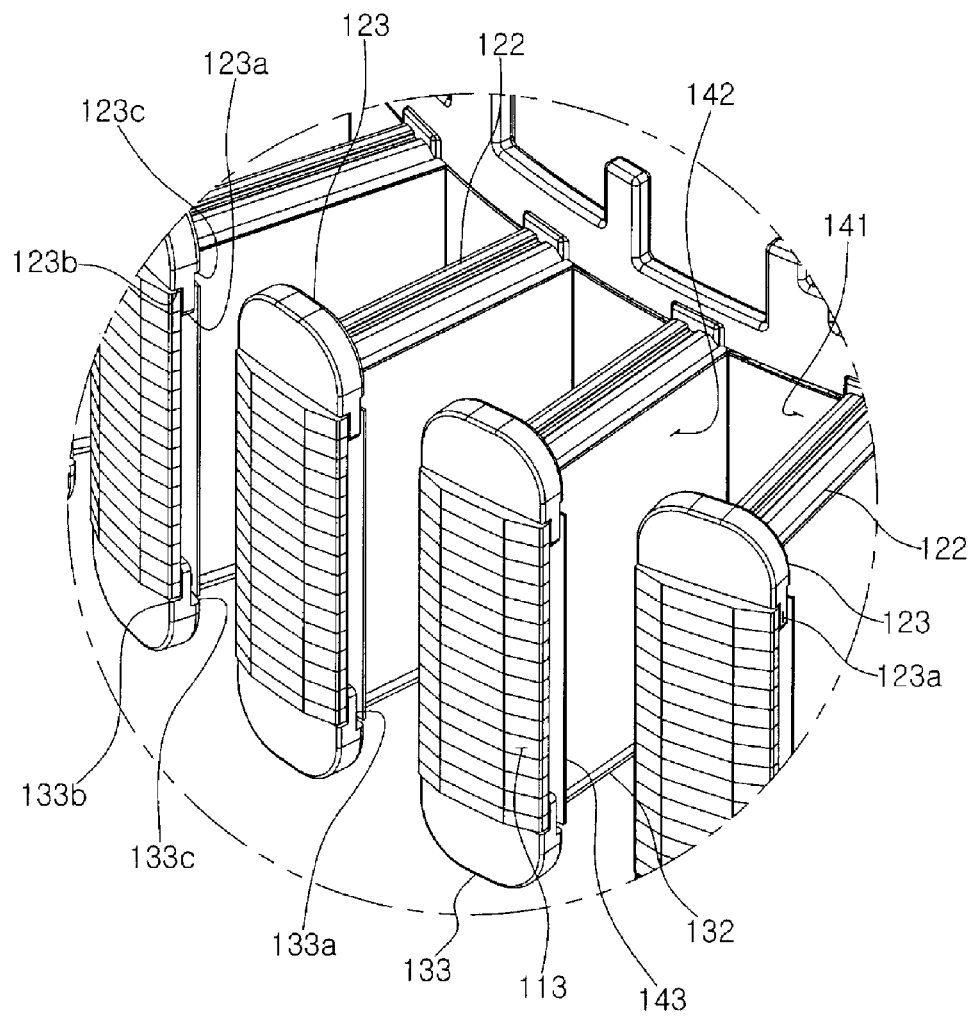
FIG. 6 is an enlarged perspective view showing a portion of the stator for a motor according to the present invention.
Figure 7:
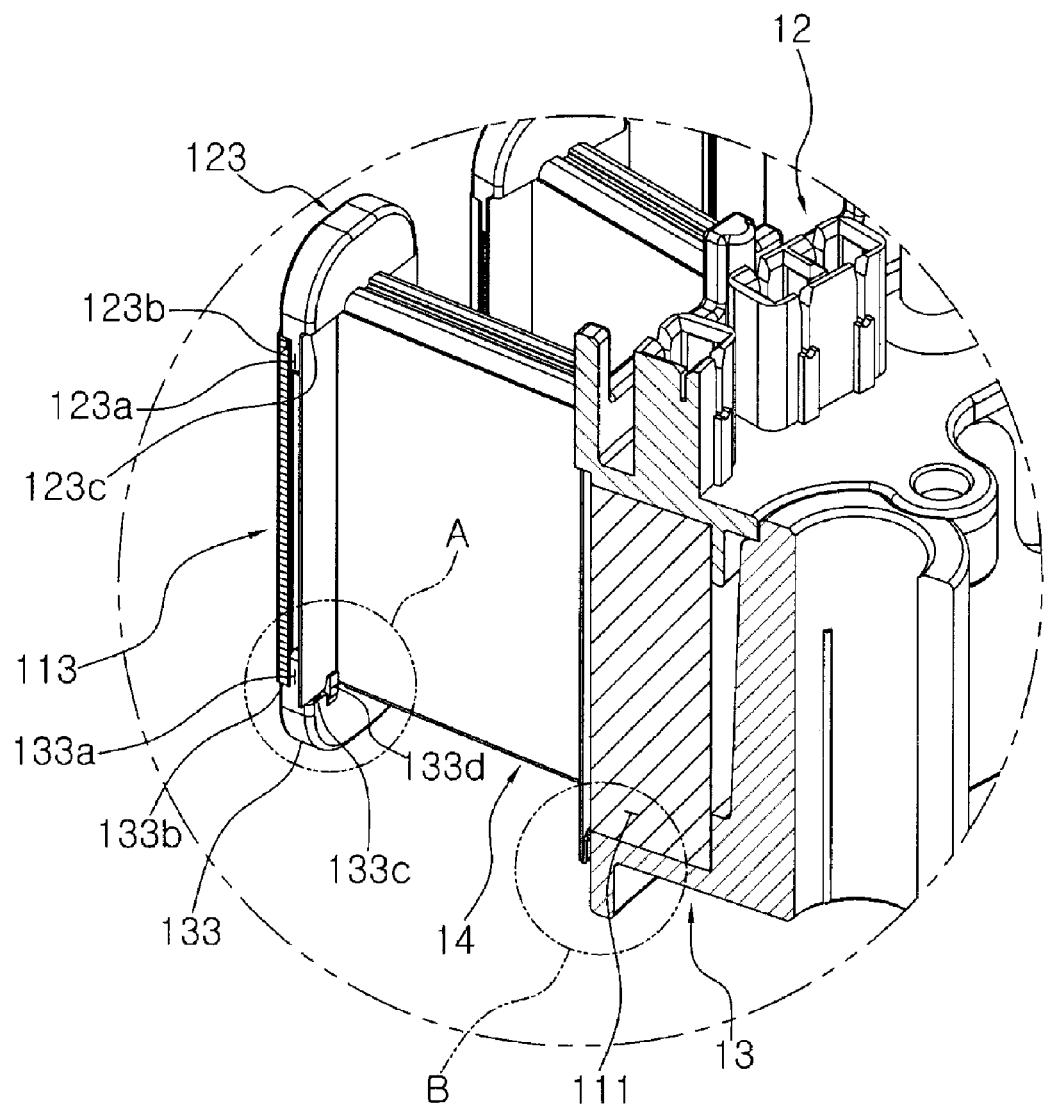
FIG. 7 is an enlarged cut perspective view showing a portion of the stator for a motor according to the present invention.
Figure 8:
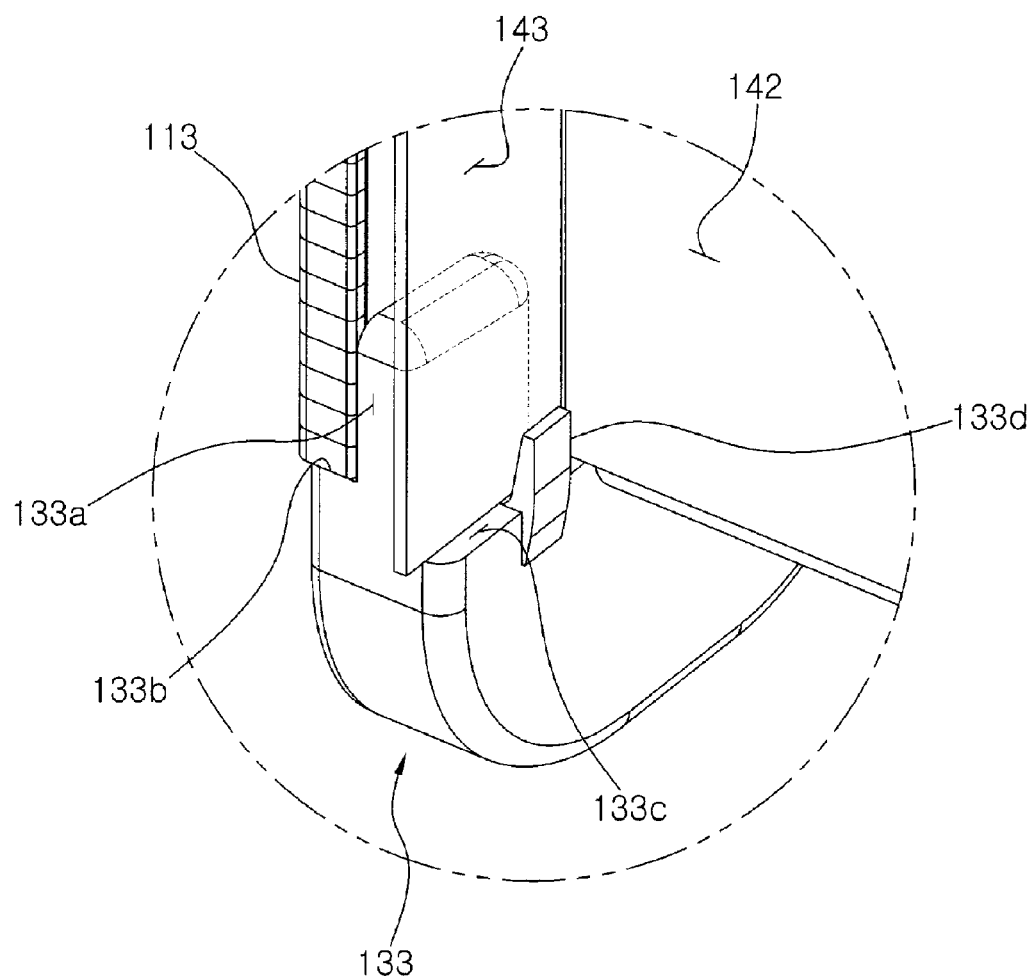
FIGS. 8 and 9 are enlarged views showing portions A and B of FIG. 7.
Figure 9:
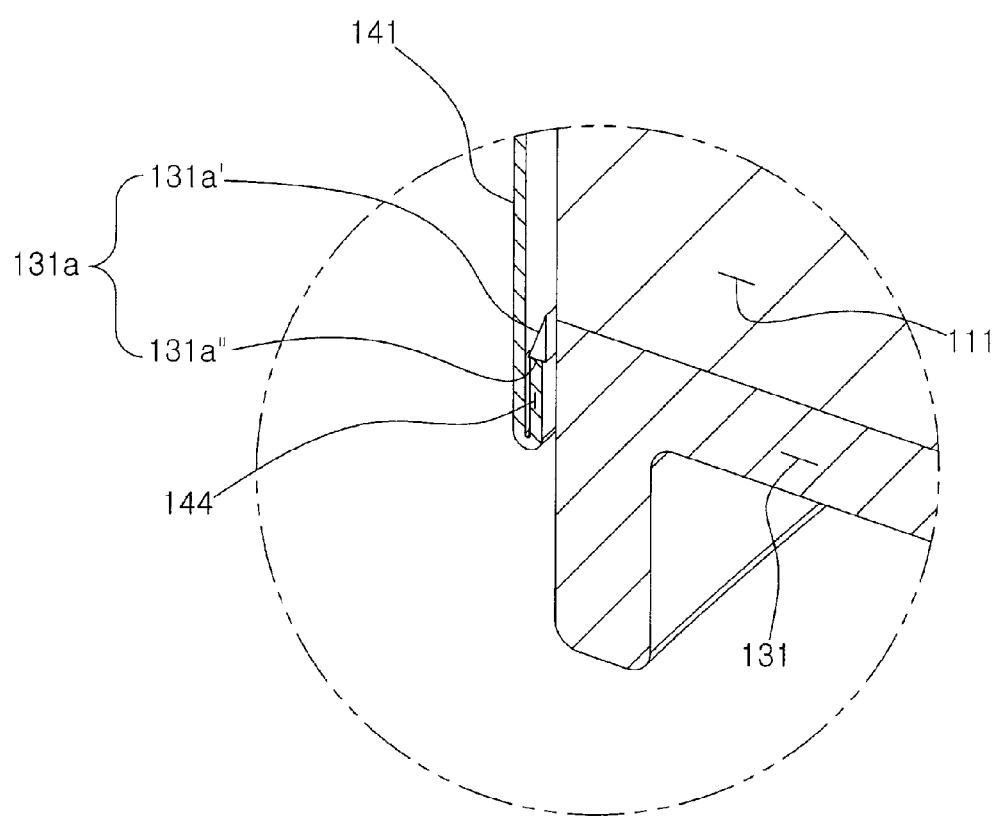

Hereinafter, an explanation on a stator for a motor according to the present invention will be in detail given with reference to the attached drawings.

According to the present invention, a motor includes a stator 10 and a rotor (which is not shown in the drawings) disposed to rotate around the stator 10. The present invention relates to the structure of the stator 10, and accordingly, an explanation on the stator 10 will be given below.

The stator 10 according to the present invention largely includes a stator core 11, an upper insulator 12, a lower insulator 13, insulation films 14 and coils (not shown). The stator core 11 has an annular back yoke 111 and a plurality of teeth 112 each protruded outward in a radial direction from an outer circumference of the back yoke 111. Slots are formed between the radially protruded teeth 111. The stator core 11 has a plurality of teeth front end portions 113 each projected in both side directions from the front ends of the teeth 112.

The stator of an outer rotor type motor having a rotor provided at the outside of the stator 10 is shown in the drawings. Contrarily, the teeth 112 may be projected inwardly in a radial direction from an inner circumference of the back yoke 111, and in this case, the stator 10 will be a stator of an inner rotor type motor.

Typically, the stator core 11 is made of steel plates punched and stacked, and thus, so as to join the layers of the stacked stator core 11 to form one unit stator core 11, caulking portions 111a are formed on the back yoke 111.

A coil (not shown) is wound on each of the teeth 112 of the stator core 11. Since the teeth 112 are in general made of a conductive material, however, insulators are provided between each of the teeth 112 and the coil for insulation between them. According to the stator 10 for the motor according to the present invention, the upper and lower sides of the stator core 11 are insulated from each other by means of upper and lower insulators 12 and 13, and the upper and lower insulators 12 and 13 are by means of the insulation films 14.

The upper insulator 12 and the lower insulator 13 are coupled to the stator core 11 in such a manner as to cover the upper and lower sides of the stator core 11. Accordingly, the upper insulator 12 and the lower insulator 13 include portions having the shapes corresponding to the back yoke 111, the teeth 112 and the teeth front end portions 113 of the stator core 11.

Referring to the drawings, the upper insulator 12 has an annular body portion 121 formed correspondingly to the back yoke 111 of the stator core 11, a plurality of teeth insulation portions 122 formed correspondingly to the teeth 112 of the stator core 11 in such a manner as to be protruded annularly from the body portion 121 to cover the upper sides of the teeth 112 of the stator core 11, and a plurality of front end insulation portions 123 formed correspondingly to the teeth front end portions 113 so as to cover the upper sides of the teeth front end portions 113 of the stator core 11. At the underside portions of the front end insulation portions 123 of the upper insulator 12 are disposed downwardly protruded supporting walls 123a for supporting the inner top end edges of the teeth front end portions 113 of the stator core 11, and at the outsides of the supporting walls 123a is disposed a front end supporting end 123b for supporting the top end edges of the teeth front end portions 113 of the stator core 11. Also, at the insides of the supporting walls 123a of the upper insulator 12 are disposed end supporting ends 123c for locking and supporting the top end edges of end portions 143 of each of the insulation films 14 as will be discussed below.

On the other hand, the lower insulator 13 has an annular body portion 131 formed correspondingly to the back yoke 111 of the stator core 11, a plurality of teeth insulation portions 132 formed correspondingly to the teeth 112 of the stator core 11 in such a manner as to be protruded annularly from the body portion 131 to cover the upper sides of the teeth 112 of the stator core 11, and a plurality of front end insulation portions 133 formed correspondingly to the teeth front end portions 113 so as to cover the upper sides of the teeth front end portions 113 of the stator core 11. At the top portions of the front end insulation portions 133 of the lower insulator 13 are disposed upwardly protruded supporting walls 133a for supporting the inner bottom end edges of the teeth front end portions 113 of the stator core 11, and at the outsides of the supporting walls 133a is disposed a front end supporting end 133b for supporting the bottom end edges of the teeth front end portions 113 of the stator core 11. Also, at the insides of the supporting walls 133a of the lower insulator 13 are disposed end supporting ends 133c for locking and supporting the lower end edges of the end portions 143 of each of the insulation films 14 as will be discussed below. Further, at the front end insulation portions 133 of the lower insulator 13 are disposed locking protrusions 133d that are protruded upwardly from the end-supporting ends 133c so as to support the ends of the end portions 143 of each of the insulation films 14. As each of the insulation films 14 is inserted into each slot, the lower end edges of the end portions 143 of the insulation film 14 are located insertedly between the supporting walls 133a and the locking protrusions 133d of the front end insulation portions 133 of the lower insulator 13 in such a manner as to be fixed without any movements. On the other hand, a plurality of locking hooks 131a are formed along the annular body portion 131 of the lower insulator 13 so as to lock the end of a locking portion 144 of each of the insulation films 14 as will be discussed below. Each of the locking hooks 131a has a sliding face 131a' formed slantly downwardly therefrom so as to allow the locking portion 144 of each insulation film 14 to slide therealong during the insulation film 14 is inserted from the upper side of the slot into the slot and has a locking projection 131a" formed at the lower position where the sliding face 131a ends so as to lock the locking portion 144 thereby in the state where the insulation film 14 is completely inserted into the slot, thereby preventing the insulation film 14 from escaping upwardly therefrom.

The upper insulator 12 and the lower insulator 13 have respective fastening portions 124 and 134, and they are assembled by coupling the fastening portions 124 and 134 facing each other in the state of covering the upper and lower sides of the stator core 11 by means of screws (which are not shown).

So as to mount the assembled stator 10 at a product like a washing machine having a motor, on the other hand, a plurality of mounting bosses 135 are arranged protrudedly in a radial direction along the inner periphery of the lower insulator 13, each mounting boss 135 being extended longitudinally in an axial direction, and mounting bolts (which are not shown) are inserted into the mounting holes of the mounting bosses 135, thereby allowing the stator 10 to be mounted at the mounting portion of the product.

The insulation film 14 is insertedly fixed to the slot formed between adjacent teeth 112 of the stator core 11 of the stator 10. Accordingly, when the coils are wound on the teeth 112, insulation is formed between the sides of the teeth 112 and the coils. Since the insulation film 14 has a substantially thin thickness, the slot is enlarged to permit a volume of coils wound to be increased. Also, since the insulation film 14 is cut to the stacked height of the stator core 11 and is inserted into the slot, there is no need to separately manufacture the upper and lower insulators 12 and 13 in accordance with the stacked heights of the stator core 11, thereby reducing the manufacturing cost of the motor.

The insulation film 14 is formed correspondingly to the slot formed between adjacent teeth 112 and is desirably made of a polyester material having predetermined elasticity. The insulation film 14 serves to cover the sides of the stator core 11 exposed as the slot between the upper insulator 12 and the lower insulator 13.

Referring to the drawings, the insulation film 14 is adapted to cover the sides of the stator core 11 exposed to the inside of the slots between the upper insulator 12 and the lower insulator 13, and the insulation film 14 includes a center portion 141 adapted to cover the side of the back yoke 111 of the stator core 11 exposed to the slot between the upper insulator 12 and the lower insulator 13 and side portions 142 extended bent from both sides of the center portion 141 to have a ⊏-shaped section so as to cover the sides of the teeth 112 of the stator core 11. Further, the insulation film 14 includes the end portions 143 bent inwardly from the respective ends of the side portions 142 so as to cover the sides of the teeth front end portions 113 protruded in both side directions from the front ends of the teeth 112 of the stator core 11. Further, the insulation film 14 includes the locking portion 144 formed folded outwardly from the lower end of the center portion 141 in such a manner as to be locked to the locking projections 131a" of the locking hooks 131a formed on the body portion 131 of the lower insulator 13.

The insulation film 14 having the above-mentioned structure is inserted into the slot between the teeth 112, while being locked to the locking structure arranged in the upper and lower insulators 12 and 13, thereby preventing escaping from the slot. Hereinafter, the locking structure in which the insulation film 14 is inserted and locked into the insulation space will be in detail discussed.

As mentioned above, the upper insulator 12 has the supporting walls 123a protruded downwardly from the underside of each of the front end insulation portions 123 and the end supporting ends 123c formed at the inside of the supporting walls 123a. As the insulation film 14 is inserted into the slot, the top end edges of the end portions 143 of the insulation film 14 are supportedly brought into close contact with the inner surfaces of the supporting walls 123a of the upper insulator 12 and the underside surfaces of the end-supporting ends 123c. Also, the lower insulator 13 has the supporting walls 133a protruded upwardly from the top of each of the front end insulation portions 133 and the end supporting ends 133c formed at the inside of the supporting walls 133a. The bottom end edges of the end portions 143 of the insulation film 14 are supportedly brought into close contact with the inner surfaces of the supporting walls 133a of the lower insulator 13 and the top surfaces of the end-supporting ends 133c. Especially, each of the front end insulation portions 133 of the lower insulator 13 has the locking protrusions 133d protruded upwardly from the end supporting ends 133c in such a manner as to support the ends of the end portions 143 of the insulation film 14. As the insulation film 14 is inserted into the slot, the bottom end edges of the end portions 143 of the insulation film 14 are insertedly positioned between the supporting walls 133a and the locking protrusions 133d of the lower insulator 13 and are fixed without any movement.

On the other hand, the end of the locking portion 144 of the insulation film 14 is locked into the locking hooks 131a formed on the body portion 131 of the lower insulator 13. That is, in a process where the insulation film 14 is inserted into the slot from the upper side of the slot, the locking portion 144 of the insulation film 14 is moved along the sliding faces 131a' of the locking hooks 131a, and in the state where the insulation film 14 is completely inserted into the slot, the locking portion 144 of the insulation film 14 is locked to the locking projections 131a" so that the insulation film 14 does not escape upwardly from the slot.

On the other hand, the insulation film 14, which is inserted into the slot and locked into the locking structure, is desirably configured to allow the portion to be contacted with the sides of the stator core 11 to be attached on the sides of the stator core 11. For example, the center portion 141 of the insulation film 14 to be brought into contact with the side of the back yoke 111 of the stator core 11 is attached thereon by means of bonding or welding, so that the insulation film 14 is reliably fixed thereto, without any escaping. As a welding method, heat welding is general wherein heat is applied to melt the insulation film 14 and the melted insulation film 14 is bonded to the side of the stator core 11, but according to the present invention, so as to provide simple equipment and reduce the time required for welding, the insulation film 14 is desirably attached on the side of the stator core through ultrasonic welding using an ultrasonic welder. The ultrasonic welder (not shown) generates ultrasonic waves therefrom and applies the ultrasonic waves to the insulation film 14, while allowing the insulation film 14 to be brought into close contact with the side of the stator core 11 by means of a welding head, thereby welding the insulation film 14 to the side of the stator core 11.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

Industrial Applicability

According to the present invention, there is provided the stator for a motor that is configured wherein the upper and lower insulators are adapted to cover the upper and lower sides of the stator core and the insulation films are adapted to be inserted between the upper and lower insulators, such that even though the stacked heights of the stator for a motor are varied, there is no need to separately manufacture the molds for molding the upper and lower insulators.

The invention claimed is:

1. A stator for a motor, comprising:
a stator core having an annular back yoke and a plurality of teeth protruded annularly inwardly from the inner periphery of the back yoke or protruded annularly outwardly from the outer periphery of the back yoke, the teeth having a slot therebetween;
an upper insulator having an annular body portion formed correspondingly to the back yoke of the stator core and a plurality of teeth insulation portions formed correspondingly to the teeth of the stator core in such a manner as to be protruded annularly from the body portion to cover the upper sides of the teeth of the stator core;
a lower insulator having an annular body portion formed correspondingly to the back yoke of the stator core and a plurality of teeth insulation portions formed correspondingly to the teeth of the stator core in such a manner as to be protruded annularly from the body portion to cover the lower sides of the teeth of the stator core;
a plurality of insulation films each adapted to be inserted into the slot to cover the side of the stator core exposed to the inside of the slot between the upper insulator and the lower insulator and having a center portion adapted to cover the side of the back yoke of the stator core exposed to the slot between the upper insulator and the lower insulator and side portions extended bent from both sides of the center portion to have a '⊏'-shaped section so as to cover the sides of the teeth of the stator core; and
coils adapted to be wound on the teeth of the stator core enclosed by the upper insulator, the lower insulator and the insulation films,
wherein the stator core has a plurality of teeth front end portions protruded in both side directions from the front ends of the teeth,
wherein each of the insulation films has end portions bent inwardly from the respective ends of the side portions so as to cover the sides of the teeth,
wherein the lower insulator has a plurality of front end insulation portions formed correspondingly to the teeth front end portions so as to cover the lower sides of the teeth front end portions of the stator core, wherein each of the front end insulation portions of the lower insulator includes i) supporting walls protruded upwardly from the top thereof, ii) a front end supporting end formed at the outsides of the supporting walls so as to support the bottom end edges of the teeth front end portions of the stator core, iii) end supporting ends positioned opposite to the front end supporting end over the supporting walls so as to support the bottom end edges of the end portions of each of the insulation films, and iv) locking protrusions protruded upwardly from the end supporting ends supporting the insulation film such that the bottom end edges of the end portions of the insulation film are insertedly disposed in a space formed by the supporting walls, the end supporting ends, and the locking protrusions and supported by the supporting walls, the end supporting ends, and the locking protrusions,
wherein each of the insulation films has a locking portion formed folded outwardly from the lower end of the center portion, and the body portion of the lower insulator has locking hooks formed thereon so as to lock the end of the locking portion thereto.

2. The stator for a motor according to claim 1, wherein the upper insulator has a plurality of front end insulation portions formed correspondingly to the teeth front end portions so as to cover the upper sides of the teeth front end portions of the stator core, wherein each of the front end insulation portions of the upper insulator has supporting walls protruded downwardly from the underside thereof, a front end supporting end formed at the outsides of the supporting walls of the upper insulator so as to support the top end edges of the teeth front end portions of the stator core, and end supporting ends formed at the insides of the supporting walls of the upper insulator so as to support the top end edges of the end portions of each of the insulation films.

3. The stator for a motor according to claim 2, wherein each of the insulation films is attached on the side of the back yoke or the sides of the teeth of the stator core contacted therewith by means of ultrasonic welding.

4. The stator for a motor according to claim 1, wherein each of the insulation films is attached on the side of the back yoke or the sides of the teeth of the stator core contacted therewith by means of ultrasonic welding.

* * * * *